(12) United States Patent
Rowell

(10) Patent No.: US 10,525,873 B2
(45) Date of Patent: Jan. 7, 2020

(54) TURN BY TURN ACTIVATION OF TURN SIGNALS

(71) Applicant: Toyota Research Institute, Inc., Los Altos, CA (US)

(72) Inventor: Todd J. Rowell, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 15/899,458

(22) Filed: Feb. 20, 2018

(65) Prior Publication Data
US 2019/0255989 A1    Aug. 22, 2019

(51) Int. Cl.
*B60Q 1/34* (2006.01)
*B60W 50/00* (2006.01)
*G06K 9/00* (2006.01)

(52) U.S. Cl.
CPC ......... *B60Q 1/346* (2013.01); *B60W 50/0097* (2013.01); *G06K 9/00798* (2013.01); *G06K 9/00845* (2013.01); *B60W 2520/06* (2013.01); *B60W 2520/10* (2013.01)

(58) Field of Classification Search
CPC ........ B60Q 1/346; B60Q 1/40; B62D 15/029; G01S 3/8083; G06K 9/00798
USPC ............................. 340/475; 701/301, 36, 523
See application file for complete search history.

(56) References Cited

U.S. PATENT DOCUMENTS

| | | | |
|---|---|---|---|
| 5,673,019 A * | 9/1997 | Dantoni | B60Q 1/346 200/61.27 |
| 8,498,778 B2 | 7/2013 | Seymour et al. | |
| 8,577,554 B2 | 11/2013 | Wolterman | |
| 9,079,499 B1 | 7/2015 | Raubvogel | |
| 9,245,448 B2 | 1/2016 | Schofield | |
| 9,248,777 B2 | 2/2016 | Au et al. | |
| 9,440,581 B2 | 9/2016 | Wolterman | |
| 9,573,515 B2 | 2/2017 | Zagorski et al. | |
| 9,616,809 B1 * | 4/2017 | Alasry | B60Q 1/346 |
| 2003/0074129 A1 * | 4/2003 | Curbow | G01C 21/26 701/523 |
| 2004/0143381 A1 | 7/2004 | Regensburger et al. | |
| 2005/0162266 A1 * | 7/2005 | Mills | B60Q 1/40 340/476 |
| 2009/0069977 A1 | 3/2009 | Markyvech | |
| 2010/0228482 A1 * | 9/2010 | Yonak | G01S 3/8083 701/301 |
| 2011/0106376 A1 | 5/2011 | Tijerina et al. | |
| 2012/0271510 A1 * | 10/2012 | Seymour | B60Q 1/346 701/36 |

(Continued)

*Primary Examiner* — Munear T Akki
(74) *Attorney, Agent, or Firm* — Dinsmore & Shohl LLP

(57) ABSTRACT

A turn signal system for activating a turn signal of a vehicle includes an electronic control unit having a processor and a non-transitory computer readable memory including a machine-readable instruction set. The electronic control unit is communicatively coupled to one or more external vehicle environment sensors, a vehicle speed sensor, and a turn signal. The machine-readable instruction set causes the processor to determine a vehicle speed based on an output signal of the vehicle speed sensor, predict a vehicle turning maneuver based on one or more environment signals output by the one or more external vehicle environment sensors when the vehicle speed is below a threshold, and automatically activate the turn signal in response to predicting the vehicle turning maneuver.

19 Claims, 7 Drawing Sheets

(56) References Cited

U.S. PATENT DOCUMENTS

2014/0309855 A1   10/2014  Tran
2017/0174261 A1*  6/2017  Micks ...................... B62D 6/00
2017/0193384 A1*  7/2017  Mudalige .......... B60W 50/0097

* cited by examiner

TURN BY TURN ACTIVATION OF TURN SIGNALS

TECHNICAL FIELD

The present specification generally relates to turn signal activation systems and methods and, more specifically, turn signal activation systems and methods for automatically activating a turn signal in response to predicting a vehicle turning maneuver based on at least a vehicle speed.

BACKGROUND

A vehicle turn signal facilitates communication between drivers of vehicles on the road. The vehicle turn signal provides other drivers with notice that the signaling vehicle is planning to or currently is preforming a vehicle turning maneuver. The signaling allows nearby drivers the ability to better anticipate and identify imminent or ongoing maneuvers by the signaling vehicle. Unfortunately, turn signals are one of the most underutilized devices on a car often because drivers forget to activate the vehicle turn signal when planning or making a vehicle turning maneuver a turn onto an intersecting road, driveway or exit/entrance ramp.

Accordingly, a need exists for improved systems and methods for automatically activating a vehicle turn signal.

SUMMARY

In one embodiment, a turn signal system for activating a turn signal of a vehicle includes an electronic control unit having a processor and a non-transitory computer readable memory including a machine-readable instruction set and one or more external vehicle environment sensors, a vehicle speed sensor, and a turn signal. The one or more external vehicle environment sensors are communicatively coupled to the electronic control unit. The vehicle speed sensor is communicatively coupled to the electronic control unit. The turn signal is communicatively coupled to the electronic control unit. The machine-readable instruction set causes the processor to determine a vehicle speed based on an output signal of the vehicle speed sensor, predict a vehicle turning maneuver based on one or more environment signals output by the one or more external vehicle environment sensors when the vehicle speed is below a threshold, and automatically activate the turn signal in response to predicting the vehicle turning maneuver.

In another embodiment, a method for activating a turn signal of a vehicle includes determining a vehicle speed based on an output signal of a vehicle speed sensor, predicting a vehicle turning maneuver based on one or more signals output by one or more external vehicle environment sensors when the vehicle speed is below a threshold and activating the turn signal of the vehicle in response to predicting the vehicle turning maneuver.

In yet another embodiment, a turn signal system for activating a turn signal of a vehicle includes an electronic control unit having a processor and a non-transitory computer readable memory including a machine-readable instruction set, at least one external environment camera for capturing image data of an external environment of the vehicle, a vehicle speed sensor, and a turn signal. The at least one external environment camera is communicatively coupled to the electronic control unit. The vehicle speed sensor is communicatively coupled to the electronic control unit. The turn signal is communicatively coupled to the electronic control unit. The machine-readable instruction set causes the processor to determine a vehicle speed based on an output signal of the vehicle speed sensor, predict a vehicle turning maneuver based on image data from the at least one external environment camera when the vehicle speed is below a threshold, and automatically activate the turn signal in response to predicting the vehicle turning maneuver.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include turn signal activation systems and methods for activating a turn signal of a vehicle. Referring generally to the figures, the turn signal activation systems and methods include one or more external vehicle environment sensors, a vehicle speed sensor, and a turn signal communicatively coupled to an electronic control unit having a processor, a non-transitory computer readable memory, and a machine-readable instruction set. The machine-readable instruction set causes the processor to at least determine a vehicle speed based on an output signal of the vehicle speed sensor, predict a vehicle turning maneuver based on one or more environment signals output by the one or more external vehicle environment sensors when the vehicle speed is below a threshold, and automatically activate the turn signal in response to predicting the vehicle turning maneuver. The various turn signal activation systems and methods for automatically activating a vehicle turn signal will be described in more detail herein with specific reference to the corresponding drawings.

Figure 1:
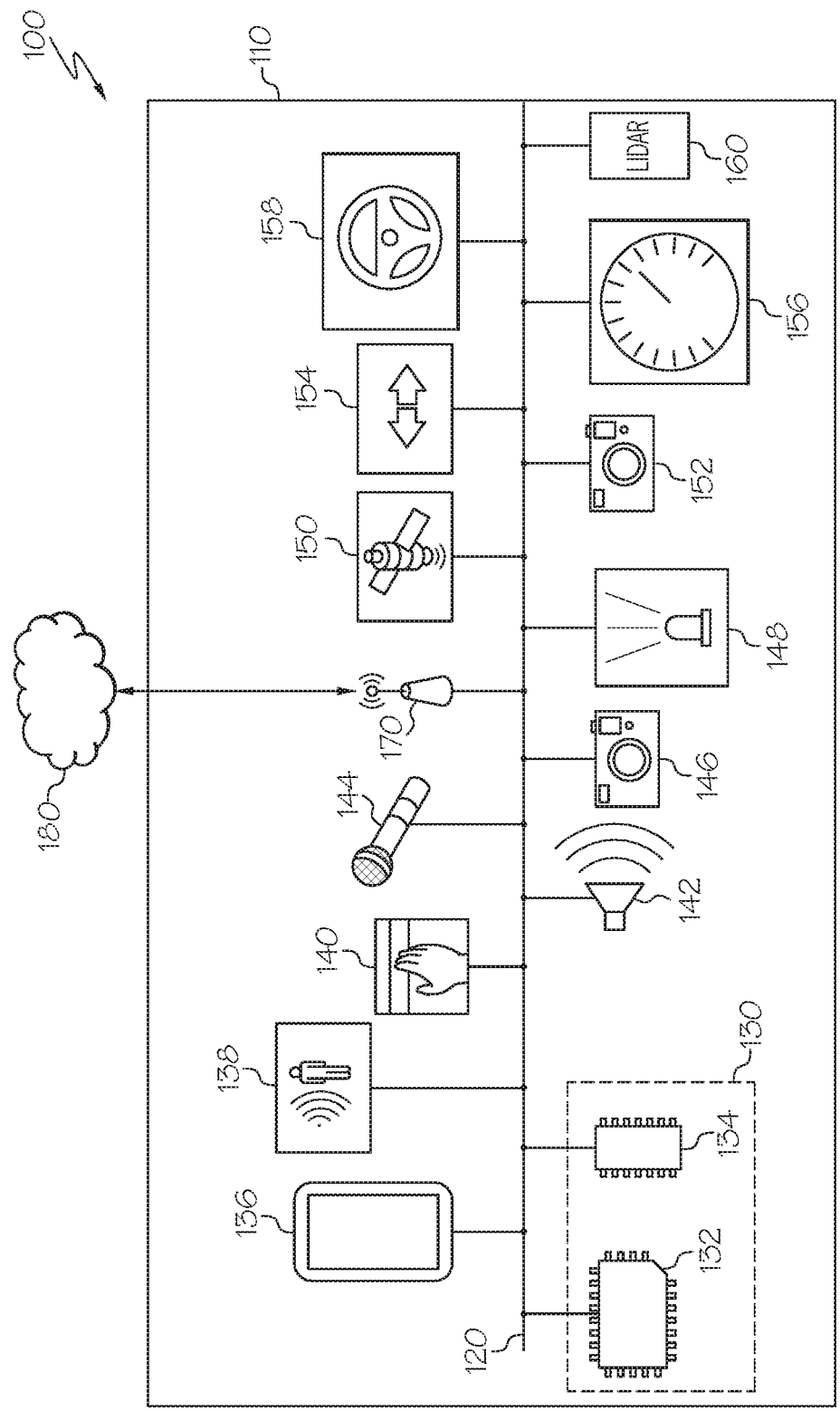
FIG. 1 schematically depicts components of a turn signal system according to one or more embodiments shown and described herein.

Turning now to the drawings wherein like numbers refer to like structures, and particularly to FIG. 1, a turn signal system 100 is depicted. The turn signal system 100 of a vehicle 110 generally includes, a communication path 120, an electronic control unit 130 comprising a processor 132 and a non-transitory computer readable memory 134, a display 136, an occupant sensor 138, an input device 140, a speaker 142, a microphone 144, one or more driver facing cameras 146, an infrared light emitter 148, a global positioning system (GPS) 150, at least one external environment camera 152, a turn signal 154, a vehicle speed sensor 156, a steering wheel sensor system 158, a LIDAR system 160 and network interface hardware 170. The vehicle 110 is communicatively coupled to a network 180 by way of the network interface hardware 170. The components of the turn signal system 100 may be contained within or mounted to a vehicle 110. The various components of the turn signal system 100 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the turn signal system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the electronic control unit 130 may be any device or combination of components comprising a processor 132 and non-transitory computer readable memory 134. The processor 132 of the turn signal system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the turn signal system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the turn signal system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

The turn signal system 100 comprises a display 136 for providing visual output such as, for example, indication of a turn signal, a message to the driver indicating the turn signal is active, the like, or a combination thereof. The display 136 is coupled to the communication path 120. Accordingly, the communication path 120 communicatively couples the display 136 to other modules of the turn signal system 100. The display 136 may include any medium capable of transmitting an optical output such as, for example, a cathode ray tube, light emitting diodes, a liquid crystal display, a plasma display, or the like. Moreover, the display 136 may be a touchscreen that, in addition to providing optical information, detects the presence and location of a tactile input upon a surface of or adjacent to the display 136. Accordingly, each display 136 may receive mechanical input directly upon the optical output provided by the display 136. Furthermore, the display 136 may be integrated into the dash of a vehicle 110 and capable of displaying multiple status indicators of the vehicle 110. Additionally, it is noted that the display 136 can include one or more processors and one or more non-transitory computer readable memories. While the turn signal system 100 includes a display 136 in the embodiment depicted in FIG. 1, the turn signal system 100 may not include a display 136 in other embodiments.

Still referring to FIG. 1, an occupant sensor 138 may be any device or combination of components capable of outputting an occupant sensor signal indicative of the presence or absence of an occupant and optionally the position of the occupant in the vehicle 110. The occupant sensor 138 may comprise a single pressure sensor provided on each vehicle seat. The occupant sensor 138 may also comprise an array of sensors including, but not limited to, a camera, a motion sensor, a strain gauge, a pressure sensor, a microphone, a heat sensor, a contact sensor and seat belt restraint sensor to determine the presence or absence of an unattended occupant. The occupant sensor 138 may comprise one or more sensor signals when provided to the electronic control unit 130 to determine the presence or absence of an occupant and optionally the position of the occupant. The occupant sensor 138 is communicatively coupled to the electronic control unit 130 providing at least one occupant sensor signal for at least determining the presence or absence of an occupant in the vehicle 110.

Still referring to FIG. 1, the input device 140 is coupled to the communication path 120 and communicatively coupled to the processor 132. The input device 140 may be any device capable of transforming user contact into a data signal that can be transmitted over the communication path 120 such as, for example, a button, a lever, a switch, a knob, a touch sensitive interface, a microphone or the like. In some embodiments, the input device 140 includes a lever for activating the turn signal, a power button, a volume button, an activation button, a scroll button, or the like. In some embodiments, the input device 140 includes a pressure sensor, a touch-sensitive region, a pressure strip, or the like. It should be understood that some embodiments may not include the input device 140 or may include more than one input device 140.

The speaker 142 (i.e., an audio output device) is coupled to the communication path 120 and communicatively coupled to the processor 132. The speaker 142 transforms audio message data as signals from the processor 132 of the electronic control unit 130 into mechanical vibrations producing sound. For example, the speaker 142 may provide to the driver a notification that the turn signal 154 was automatically activated by the turn signal system 100. The audio message may act as a reminder for the driver to remember to manually activate the turn signal 154 in the future. However, it should be understood that, in other embodiments, the turn signal system 100 may not include the speaker 142.

The microphone 144 is coupled to the communication path 120 and communicatively coupled to the processor 132. The microphone 144 may be any device capable of transforming a mechanical vibration associated with sound into an electrical signal indicative of the sound. The microphone 144 may be used to monitor sound levels, such as the existence of a conversation within the vehicle 110 or whether the stereo is active and at what level. The microphone 144 may be implemented, as described in more detail herein, to build a driver profile for improving the prediction of when to activate a turn signal. Furthermore, the microphone 144 may be an input device 140 to capture verbal commands. It should be understood that some embodiments may not include the microphone 144.

Still referring to FIG. 1, one or more driver facing cameras 146 are coupled to the communication path 120 and communicatively coupled to the processor 132. The one or more driver facing cameras 146 may be any device having an array of sensing devices (e.g., pixels) capable of detecting radiation in an ultraviolet wavelength band, a visible light wavelength band, or an infrared wavelength band. The one or more driver facing cameras 146 may have any resolution. The one or more driver facing cameras 146 may be an omni-directional camera, or a panoramic camera. In some embodiments, one or more optical components, such as a mirror, fish-eye lens, or any other type of lens may be optically coupled to each of the one or more driver facing cameras 146. In embodiments described herein, the one or more driver facing cameras 146 may provide image data to the electronic control unit 130 from various viewpoints within the vehicle 110. For example, the one or more driver facing cameras 146 may be positioned facing the driver of the vehicle 110 to capture head or eye movement of the driver. In further embodiments, one or more driver facing cameras 146 may be positioned facing the driver of the vehicle 110 to capture one of several driver actions including but not limited to eye movement, head movement, shoulder movement, torso movement, change in grip on a steering wheel, or the like. Additionally, one or more driver facing cameras 146 may capture portions of the vehicle cabin to determine the number of occupants and occupant actions, for example, without limitation, the detection of a child in the vehicle 110.

In some embodiments, an infrared light emitter 148 is coupled to the communication path 120 and communicatively coupled to the processor 132. Infrared light, also known as infrared radiation is a type of electromagnetic (EM) radiation like visible light, but infrared light is generally invisible to the human eye. EM radiation is transmitted in waves or particles across a range of wavelengths and frequencies. Infrared light waves are longer than those of visible light, just beyond the red end of the visible spectrum. An infrared light emitter 148 emits infrared light in the range of the (EM) spectrum between microwaves and visible light. Infrared light has frequencies from about 300 GHz up to about 400 THz and wavelengths of about 1 millimeter to 740 nanometers, although these values are not absolute. The spectrum of infrared light can be described in sub-divisions based on wavelength and frequency. For example, near-infrared may have a frequency of about 214 THz to about 400 THz and a wavelength to about 1400 nanometers of about 740 nanometers and far-infrared may have a frequency of about 300 GHz to about 20 THz and a wavelength of about 1 millimeter to about 15 micrometers. Infrared light may be subdivided into further divisions.

In some embodiments, the infrared light emitter 148 may be used to track eye movement. For example, without limitation, near-infrared light produced by an infrared light emitter 148 along with one or more driver facing cameras 146 can track eye movement. In operation, near-infrared light is directed towards the eyes (pupil), causing visible reflections in the cornea (outer-most optical element of the eye). These reflections are tracked by one or more driver facing cameras 146. The underlying concept is commonly referred to as pupil center corneal reflection (PCCR). While the visible spectrum is likely to generate uncontrolled specular reflection, infrared light is not perceivable by the human eye and therefore allows for a more precise differentiation between the pupil and the iris. For example, while the infrared light directly enters the pupil, the infrared light just reflects off the iris, which is able to be captured by one or more driver facing cameras 146 and processed by the processor 132 to determine eye movements. Other methods of tracking and determining eye movement are known and may be employed for determining an eye movement of the driver or other driver actions as described herein.

The image data may be received by the processor 132, which may process the image data using one or more image tracking and processing algorithms. Any known or yet-to-be developed video and image tracking algorithms may be applied to the image data in order to recognize movements captured in the image data. Example video and image tracking algorithms include, but are not limited to, kernel-based tracking (mean-shift tracking) and contour tracking algorithms. In general, video and image tracking algorithms analyze sequential image data to determine movement between frames. In addition to tracking and determining movement the processor 132 may employ one or more object recognition algorithms to the image data to extract objects and features. Any known or yet-to-be-developed object recognition algorithms or facial recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132.

Still referring to FIG. 1, a global positioning system, GPS 150, is coupled to the communication path 120 and communicatively coupled to the electronic control unit 130. The GPS 150 is capable of generating location information indicative of a location of the vehicle 110 by receiving one or more GPS signals from one or more GPS satellites. The GPS signal communicated to the electronic control unit 130 via the communication path 120 may include location information comprising a National Marine Electronics Association (NMEA) message, a latitude and longitude data set, a street address, a name of a known location based on a location database, or the like. Additionally, the GPS 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

In embodiments, as depicted in FIG. 1, the turn signal system 100 includes one or more external vehicle environment sensors, which may include at least one external environment camera 152 communicatively coupled to the communication path 120. The at least one external environment camera 152 may be any device having an array of sensing devices (e.g., pixels) capable of detecting radiation in an ultraviolet wavelength band, a visible light wavelength band, or an infrared wavelength band. The at least one external environment camera 152 may have any resolution. The at least one external environment camera 152 may be an omni-directional camera, or a panoramic camera. In some embodiments, one or more optical components, such as a mirror, fish-eye lens, or any other type of lens may be optically coupled to each of the at least one external environment camera 152. In embodiments described herein, the at least one external environment camera 152 may capture image data of the environment external to the vehicle 110 and provide the image data to the electronic control unit 130. The at least one external environment camera 152 may be positioned within or on the vehicle 110 to view the environment external to the vehicle 110. For example, without limitation, at least one external environment camera 152 may be positioned on the dashboard of the vehicle 110 to capture images of the surroundings in front of the vehicle 110 during operation. The position of the at least one external environment camera 152 is not limited to the dashboard of the vehicle 110. The at least one external environment camera 152 may be positioned anywhere on or within the vehicle 110 to capture images of surroundings of the vehicle 110 during operation.

Still referring to FIG. 1, the turn signal 154 is coupled to the communication path 120 and communicatively coupled to the processor 132. In general, a turn signal 154 includes connection to a power source, a timing circuit or thermal flasher, a signal switch, and multiple illumination sources. A turn signal 154 may be activated, in most vehicles, by moving a lever between positions indicative of signaling right, signaling left, and off or neutral. Activating a turn signal is a manual process in some instances. However, in embodiments of the turn signal system 100 an electronic or electromechanical switch may be included in the turn signal 154 to automatically activate the turn signal 154.

A vehicle speed sensor 156 is coupled to the communication path 120 and communicatively coupled to the electronic control unit 130. The vehicle speed sensor 156 may be any sensor or system of sensors for generating a signal indicative of vehicle speed. For example, without limitation, a vehicle speed sensor 156 may be a tachometer that is capable of generating a signal indicative of a rotation speed of a shaft as in a vehicle 110 engine or a drive shaft. Vehicle speed sensor signals are communicated to the electronic control unit 130 and converted a vehicle speed value. The vehicle speed value is indicative of the speed of the vehicle 110. In some embodiments, the vehicle speed sensor 156 comprises an opto-isolator slotted disk sensor, a Hall Effect sensor, a Doppler radar, or the like. In some embodiments, a vehicle speed sensor 156 may comprise data from a GPS 150 for determining the speed of a vehicle 110. The vehicle speed sensor 156 may be provided so that the electronic control unit 130 may determine when the vehicle 110 accelerates, maintains a constant speed, slows down or is comes to a stop. For example, a vehicle speed sensor 156 may provide signals to the electronic control unit 130 indicative of a vehicle 110 slowing down prior to making a vehicle turning maneuver.

Still referring to FIG. 1, the steering wheel sensor system 158 is coupled to the communication path 120 and communicatively coupled to the electronic control unit 130. The steering wheel sensor system 158 may comprise a plurality of sensors located in the steering wheel for determining a driver grip on the steering wheel, the degree of rotation applied to the steering wheel or the forces applied in turning or maintaining the steering wheel. The steering wheel sensor system 158 may provide signals to the electronic control unit 130 indicative of the location and number of hands on the steering wheel, the strength of the grip on the steering wheel, or changes in position of one or more hands on the steering wheel. The steering wheel sensor system 158, for example, without limitation, may include pressure sensors, inductive sensors, optical sensors, or the like. In addition to detecting the location, number, grip and change in position of one or more hands on the steering wheel, the steering wheel sensor system 158 may also include one or more sensors indicating the rotational angle of the steering wheel and corresponding signals to the electronic control unit 130. As later described, the combination of steering wheel rotation and steering wheel grip may be suggestive of a driver planning to initiate a vehicle turning maneuver. It should be understood that some embodiments may not include a steering wheel sensor system 158.

In some embodiments, the one or more external vehicle environment sensors may include a LIDAR system 160. The LIDAR system 160 is communicatively coupled to the communication path 120 and the electronic control unit 130. A LIDAR system 160 or light detection and ranging is a system and method of using pulsed laser light to measure distances from the LIDAR system 160 to objects that reflect the pulsed laser light. A LIDAR system 160 may be made as solid-state devices with few or no moving parts, including those configured as optical phased array devices where its prism-like operation permits a wide field-of-view without the weight and size complexities associated with a traditional rotating LIDAR system 160. The LIDAR system 160 is particularly suited to measuring time-of-flight, which in turn can be correlated to distance measurements with objects that are within a field-of-view of the LIDAR system 160. By calculating the difference in return time of the various wavelengths of the pulsed laser light emitted by the LIDAR system 160 a digital 3-D representation of a target or environment may be generated. The pulsed laser light emitted by the LIDAR system 160 may in one form be operated in or near the infrared range of the electromagnetic spectrum, with one example having emitted radiation of about 905 nanometers. Sensors such as LIDAR systems 160 can be used by vehicle 110 to provide detailed 3D spatial information for the identification of objects near the vehicle 110, as well as the use of such information in the service of systems for vehicular mapping, navigation and autonomous operations, especially when used in conjunction with geo-referencing devices such as GPS 150 or a gyroscope-based inertial navigation unit (INU, not shown) or related dead-reckoning system, as well as non-transitory computer readable memory 134 (either its own or memory of the electronic control unit 130).

The network interface hardware 170 is coupled to the communication path 120 and communicatively coupled to the electronic control unit 130. The network interface hardware 170 may be any device capable of transmitting and/or receiving data via a network 180. Accordingly, network interface hardware 170 can include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 170 includes hardware configured to operate in accordance with the Bluetooth wireless communication protocol. In another embodiment, network interface hardware 170 may include a Bluetooth send/receive module for sending and receiving Bluetooth communications to/from a network 180. The network interface hardware 170 may also include a radio frequency identification ("RFID") reader configured to interrogate and read RFID tags.

In some embodiments, the turn signal system 100 may be communicatively coupled to nearby vehicles via the network 180. In some embodiments, the network 180 is a personal area network that utilizes Bluetooth technology to communicatively couple the turn signal system 100 and the nearby vehicles. In other embodiments, the network 180 may include one or more computer networks (e.g., a personal area network, a local area network, or a wide area network), cellular networks, satellite networks and/or a global positioning system and combinations thereof. Accordingly, the turn signal system 100 can be communicatively coupled to the network 180 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 180 may be utilized to communicatively couple the turn signal system 100 with the nearby vehicles. The nearby vehicles may include network interface hardware 170 and an electronic control unit 130 having a processor 132 and non-transitory computer readable memory 134 capable of being communicatively coupled with the turn signal system 100. A processor 132 of the nearby vehicles may execute a machine-readable instruction set stored in the non-transitory computer readable memory 134 to communicate with the turn signal system 100.

The following sections will now describe embodiments of the operation of the turn signal system 100 for automatically activating a turn signal based on a vehicle speed and one or more external vehicle environment sensors. In some embodiments of the turn signal system 100, the system comprises an electronic control unit 130 having a processor 132 and a non-transitory computer readable memory 134, a vehicle speed sensor 156, one or more external vehicle environment sensors and a turn signal 154 communicatively coupled to the electronic control unit 130. In some embodiments, the turn signal system 100 includes additional sensors and systems as described herein.

Figure 2:
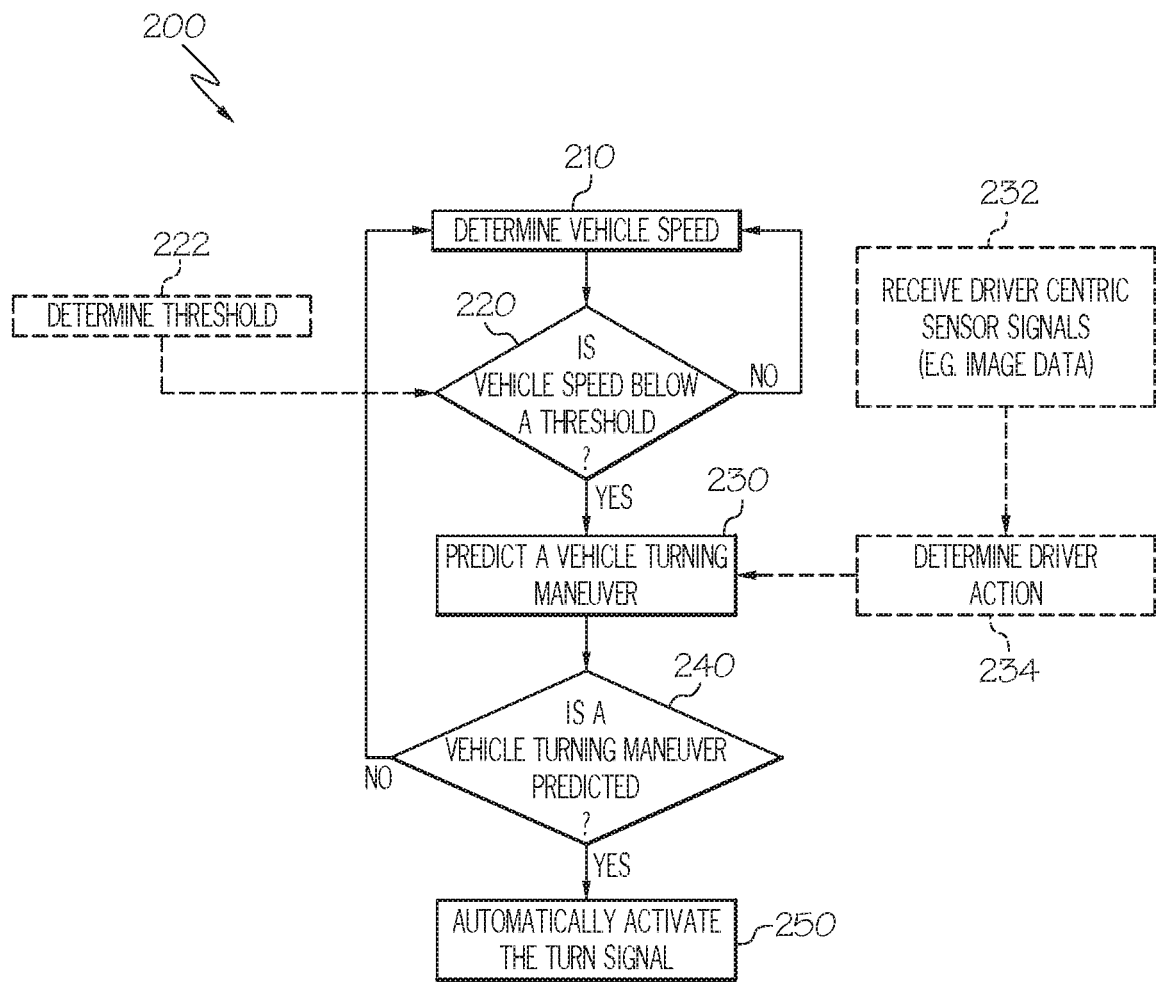
FIG. 2 is a flowchart depicting a turn signal method for automatically activating a turn signal according to one or more embodiments shown and described herein.

Referring now to FIG. 2, a flowchart 200 of a method for a turn signal system 100 for automatically activating a turn signal based one or more environment signals output from the one or more external environment sensors when the vehicle speed is below a threshold. The flowchart 200 depicted in FIG. 2 is a representation of a machine-readable instruction set stored in the non-transitory computer readable memory 134 and executed by the processor 132 of the electronic control unit 130. The process of the flowchart 200 in FIG. 2 may be executed at various times and in response to signals from the sensors communicatively coupled to the electronic control unit 130.

In step 210, the electronic control unit 130 determines the vehicle speed. In some embodiments, the electronic control unit 130 receives a signal from the vehicle speed sensor 156 indicative of vehicle speed. The processor 132 receives the signal and converts the signal into a vehicle speed value that may then be stored in the non-transitory computer readable memory 134. The vehicle speed value may be continuously updated and compared to previous vehicle speed values to determine changes in the vehicle speed. As discussed above, the vehicle speed sensor 156 may be any sensor or system of sensors for generating a signal indicative of vehicle speed.

Once the vehicle speed is determined in step 210, the vehicle speed is compared to a threshold to determine whether the vehicle speed is below the threshold, in step 220. Step 220 may receive a threshold from step 222, where the threshold is determined. The threshold may be a single preset value stored in the non-transitory computer readable memory 134, selected from one of many values stored in the non-transitory computer readable memory 134 or computed based on vehicle 110 and environment conditions. For example, without limitation, a threshold may be selected or computed in step 222 in response the proximity of a vehicle 110 to the location of a potential turn, an angle between a current vehicle trajectory and a predicted vehicle trajectory upon completing the vehicle turning maneuver, a combination thereof or other vehicle 110 and environment conditions. Additional examples of determining a threshold will be discussed herein.

If the vehicle speed is not below the threshold, the turn signal system 100 returns to step 210 and continues a loop of determining the vehicle speed in step 210 and comparing the vehicle speed to threshold in step 220. However, when the vehicle speed is determined to be below the threshold, the turn signal system 100 proceeds to step 230 to predict a vehicle turning maneuver.

In step 230, predicting a vehicle turning maneuver includes receiving the one or more environment sensor signals output by the one or more external vehicle environment sensors and determining the likelihood of a vehicle turning maneuver. In order to predict a vehicle turning maneuver the system determines where a vehicle turning maneuver may be performed in the environment around the vehicle. For example, the one or more external vehicle environment sensors may include at least one external environment camera 152, a LIDAR system 160, a navigation system including a GPS 150 and map data, or similar systems and sensors. The one or more external vehicle environment sensors may identify a road that intersects a vehicle's current path of travel, a driveway, an alley, an exit or entrance ramp or the like.

In some embodiments, the one or more external vehicle environment sensors include at least one external environment camera 152 positioned to view an external environment of the vehicle 110. The at least one external environment camera 152, for example, may be positioned on the dashboard of the vehicle 110 to capture images of the surroundings in front of the vehicle 110 during operation. The position of the at least one external environment camera 152 is not limited to the dashboard of the vehicle 110. The at least one external environment camera 152 may be positioned anywhere on or within the vehicle 110 to capture images of surroundings of the vehicle 110 during operation.

Image data generated by the at least one external environment camera 152 is received by the electronic control unit 130 where the image data is processed by the processor 132 implementing one or more algorithms known or yet-to-be developed for determining the presence of objects, roads or signs in an environment of a vehicle 110. In some embodiments, image data generated by the at least one external environment camera 152 may be pre-processed by an image processor before being transmitted to and received by the electronic control unit 130. Alternatively, processing the image data may occur within an image-processing controller having a separate processor and non-transitory computer readable memory 134 communicatively coupled to the electronic control unit 130.

Once the image data is received by the electronic control unit 130, the image data is analyzed. Analyzing image data may comprise pre-processing, recognition of objects, roads, signs and/or other features, and post-processing steps. As a non-limiting example, during pre-processing an image may be reviewed to reduce noise in the image data, enhance contrast, apply scale-spacing to address variations in sizes between real-world objects and image data of the real-world object, or the like. Further, as a non-limiting example, recognition of objects, roads, signs and/or other features from the image data may comprise applying pattern matching algorithms, image correlation algorithms or the like. Additionally, as a non-limiting example, post-processing of the image data may comprise filtering the converted image data through a database of known objects, roads, or signs thereby associating the converted image data with known locations, representative images, or the like.

In some embodiments, the one or more external vehicle environment sensors include a LIDAR system 160 having one or more LIDAR sensors communicatively coupled to the electronic control unit 130 and positioned on a vehicle 110 to map an external environment of the vehicle 110. The one or more LIDAR sensors, for example, may be positioned at one or more locations on a vehicle 110 such as the bumpers, the dashboard, above the windshield, on the roof, or the like to form fields-of-view around the vehicle 110. The one or more LIDAR sensors and system illuminate a target with a pulsed laser light and measure the reflected pulses with a sensor to measure distance to a target. The distance measurement signals generated by the one or more LIDAR sensors are received by the processor 132 and analyzed to generate a topography of the environment around the vehicle 110. From the topography, the processor 132 may determine and identify the presence of objects, roads or signs in an environment of a vehicle 110.

In some embodiments, the one or more external vehicle environment sensors may include a GPS 150 and map data. The GPS 150 is communicatively coupled to the electronic control unit 130 and the map data may be stored in non-transitory computer readable memory 134. The GPS 150 may generate signals indicative of a location of a vehicle 110 and provide those to the electronic control unit 130. The electronic control unit 130 may then correlate signals indicative of the location of the vehicle 110 with map data stored in memory to determine and identify the presence of objects, roads or signs in an environment of a vehicle 110.

In yet other embodiments, one or more external vehicle environment sensors may include a combination of at least one external environment camera 152, LIDAR system 160, a navigation system including a GPS 150 and map data, or similar systems and sensors. The turn signal system 100 may implement a combination of signals and data generated by the one or more external vehicle environment sensors to determine and identify the presence of objects, roads or signs in the environment of a vehicle 110.

Once at least a road is identified by the electronic control unit 130 from the one or more external vehicle environment sensors the signals and data generated by the one or more external vehicle environment sensors may be further processed to determine distances between the vehicle 110 and the identified road, driveway, alley, exit or entrance ramp or the like that intersects a vehicle's current path of travel. Additionally, the data may further be used to extrapolate an angle defining the change in a vehicle's trajectory between the current trajectory of the vehicle 110 and a predicted vehicle trajectory upon completing the vehicle turning maneuver. As discussed above and further described by way of examples herein, the distance between the vehicle 110 and the identified road or path a vehicle 110 may turn onto and the angle between the current trajectory of the vehicle 110 and the predicted vehicle trajectory upon completing the vehicle turning maneuver may further be utilized to refine the threshold that a vehicle speed is required to be below to predict a vehicle turning maneuver.

In some embodiments, in step 230, predicting a vehicle turning maneuver includes performing a loop where a current speed of a vehicle 110 is compared to the threshold, which may also dynamically change based on the distance between the vehicle 110 and the identified road or path a vehicle 110 may make a turn onto. For example, as the vehicle 110 approaches a possible turn the threshold for the vehicle speed may decrease because the feasibility of a vehicle 110 to make a turn above a threshold within the remaining distance to the turn and the angle of the turn required to make the vehicle turning maneuver may become less possible unless the vehicle 110 is below an even lower threshold than previously determined. Similarly, step 230 of predicting a vehicle turning maneuver may also include determining a confidence level for the prediction. The confidence level may indicate how likely it is that a vehicle turning maneuver will occur. The confidence level may be adjusted based on the vehicle speed in relation to the threshold and/or the one or more environment signals output by the one or more external vehicle environment sensors.

For example, if a vehicle is traveling at vehicle speed above a threshold then the confidence level associated with the prediction that a vehicle 110 makes a turning maneuver will be low. However, if the distance between the vehicle 110 and the identified intersecting road in front of the vehicle 110 is sufficient for the vehicle 110 to slow and make the turn then the confidence level for that predicted vehicle turning maneuver may be higher than the former. In yet a further example, if it is determined that the vehicle 110 is slowing but not yet below the threshold then the confidence level for that predicted vehicle turning maneuver may be even higher than the two former examples.

Determining the confidence level associated with a predicted vehicle turning maneuver may also include an assessment of the angle of the turn as well as other vehicle attributes and environment conditions. For example, vehicle attributes such as turning radius, vehicle weight, brake condition, tire wear, or the like may be factored. Additionally, environment conditions such as visibility, whether it is raining, or other weather conditions may also be factored. For example, if it is raining then the threshold for the vehicle speed may be set at a lower speed than compared to dry driving conditions.

In yet other embodiments, in step 230, predicting a vehicle turning maneuver may factor in driver actions determined in steps 232 and 234. Referring to steps 232 and 234, one or more driver centric sensors may be used to determine a driver action that is indicative of a driver planning to initiate a vehicle turning maneuver. In step 232, the electronic control unit 130 receives image data from one or more driver facing cameras 146 communicatively coupled to the electronic control unit 130. The one or more driver facing cameras 146 may be positioned to capture image data of the driver, which includes a number of driver actions. The one or more driver facing cameras 146 may also capture an image of the face of a driver to identify the driver. Driver actions captured by the one or more driver facing cameras 146 may include, but are not limited to, eye movement, head movement, shoulder movement, torso movement, grip position of the steering wheel and the like. Additionally, the one or more driver facing cameras 146 may operate as an occupant sensor 138 for determining the presence of other occupants in the vehicle 110. In embodiments described herein, the one or more driver facing cameras 146 may provide image data to the electronic control unit 130 from various viewpoints within and around the vehicle 110.

Once the electronic control unit 130 receives image data from the one or more driver facing cameras 146, the electronic control unit 130 may determine the identity of the driver and then in step 234 determine a driver action that is indicative of a driver planning to initiate a vehicle turning maneuver. In some embodiments, identifying the driver, may not be based on image data received during step 232. Determining the identity of the driver may be based on, for example, without limitation, detecting a key that is unique to a driver used to access or start the vehicle 110, a portable device paired with the vehicle 110, a voice print from a microphone 144, or by a variety other identification detection systems for vehicles. The identification of the driver allows the turn signal system 100 to recall or create a profile specific to the driver. The driver profile for purposes of the turn signal system 100 comprises a characterization of driver actions leading up to a driver initiating a vehicle turning maneuver. In some embodiments, the driver profile may include one or more elements that make up a more complex driver action and are indicative of a driver planning to initiate a vehicle turning maneuver. The elements may include for example, without limitation, a duration of time the element occurs, a degree of rotation, or other quantifiable valuations to further refine the element and the driver action. For example, a driver action of looking left may be characterized into elements such as degrees of head rotation, degrees of shoulder rotation, and a change in weight displacement in a vehicle seat. By detecting a plurality of elements with various types of sensors, including but not limited to the one or more driver facing cameras 146, microphone 144, occupant sensor 138 and the like, data can be generated to define a driver action into refined elements to build and update a driver profile.

Additionally, once the electronic control unit 130 receives image data from the one or more driver facing cameras 146, the electronic control unit 130 may determine eye movement, head movement, or one or more elements that make up a more complex driver action and are indicative of a driver planning to execute a vehicle turning maneuver. As discussed above, the electronic control unit 130 may employ various algorithms for determining movement within image data. As used herein, rotation of the head generally means the head moves left or right such that the chin moves towards or away from a shoulder. In some embodiments, rotation of the head by about 5 degrees may be determined by the electronic control unit 130. In other embodiments, rotation of the head by about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees or about 90 degrees left or right is determined by the electronic control unit 130. Similarly, eye movement may be determined with or independently of head movement. Eye tracking algorithms may characterize eye movement based on inferior, superior, and lateral movements. As used herein, inferior eye movements describe downward movements, superior describe upward movements and lateral movements also described as duction with adduction referring to an eye movement toward the nose (nasal) and abduction referring to an eye movement away from the nose (temporal). Eye tracking may be accomplished by focusing on a signal eye, both eyes or a combination of both eyes depending on the position of the head with respect to the one or more driver facing cameras 146.

Although a driver may not manually activate a signal prior to making a turning maneuver, drivers typically, for example without limitation, check side mirrors by moving their eyes and/or head to view the side mirrors, check a blind spot by looking left and/or right out a vehicle window, check a rear view mirror by looking upward, or even looking at the dash for a blind spot warning indicator, side facing camera warning or the like prior to executing a vehicle turning maneuver. In response to capturing driver actions such as eye or head movement with the one or more driver facing cameras 146, in step 232, and analyzing the image data with the electronic control unit 130 to determine the driver action, in step 234, a prediction, in step 230, may be made as to whether a vehicle turning maneuver is forthcoming. The prediction in step 230 may be further refined by comparing the determined driver action in step 234 with a driver profile that may include a set of eye movements, head movements or one or more elements that make up a more complex driver action or combinations thereof indicative of a specific driver's typical behavior prior to initiating a vehicle turning maneuver. For example, without out limitation, when eye and/or head movement indicative of a view in the direction of the left window or left side of the windshield is determined from the image data, an intersecting road to the left is present as determined based on the one or more external vehicle environment sensors, and the vehicle speed is below a threshold then the turn signal system 100 in step 230 may predict that a vehicle turning maneuver to the left is about to occur.

Referring now to step 240, if a vehicle turning maneuver is predicted in step 230, then step 240 causes the electronic control unit 130 to generate a signal to activate the turn signal 154 in step 250. In some embodiments, step 250 may vary the frequency or intensity of turn signal that is activated. For example, if the prediction is made with a high confidence level then the turn signal that is activated may be the normal type of turn signal configured for the vehicle 110. However, if the prediction is made with a low level confidence level then the turn signal that is activated may include a slower than normal frequency and may be less intense. By activating the turn signal with a frequency and/or intensity different from normal, that is either a slower or faster frequency and greater or less intensity, may indicate to other drivers on the road the possibility of a vehicle turning maneuver albeit a low confidence of occurring. Alternatively, if a vehicle turning maneuver is not predicted in step 230, then step 240 causes the electronic control unit 130 to return to step 210.

In some embodiments, the electronic control unit 130 updates the driver profile with the driver actions detected during a previous vehicle turning maneuver. The update may further refine an element of a driver action that was already defined in the driver profile or may include a new driver action in the driver profile. In some embodiments, the driver profile is updated to include a condition detected around the driver or include a new condition detected during the previous iteration that resulted in automatic activation of the turn signal 154. Finally, the electronic control unit 130 may evaluate and adjust the relevance values in the driver profile. A relevance value may be assigned to each element of the driver profile and optionally define the significance of that element to predicting a vehicle turning maneuver. For example, when turning right a driver more often preforms a driver action to check their blind spot than checking their rear view mirror. Therefore, if the elements of a driver action to check their blind spot occurs then the associated elements may be more relevant in predicting a vehicle turning maneuver than the elements associated with looking in the rear view mirror. In a further example, without limitation, if a driver consistently or more often than not just uses their eyes to glance in the mirrors rather than turning their head to more directly look at the mirrors, then head movement may receive a lower relevancy value than eye movement when determining a driver action indicative of a driver planning to initiate a vehicle turning maneuver.

In some embodiments, the turn signal system 100 may use previous iterations of a driver failing to manually activate a turn signal to improve the prediction algorithm of step 230. For example, if a driver time after time puts both hands on the wheel prior to making a turn, then the steering wheel grip sensor data would be adjusted to be more relevant and the act of putting both hands on the wheel would be added or updated in the driver profile. Similarly, if a driver is determined to exhibit certain driver actions prior to failing to activate a turn signal when determined to be close to home based on GPS location data then the relevancy of the elements of a driver action based on distance from a home location may be adjusted. Numerous combinations of driver actions and conditions surrounding the driver disclosed herein may be determined and characterized to define a driver profile. Additionally, numerous driver actions and conditions surrounding the driver not stated herein may also be implemented to predict whether a driver is planning to initiate a vehicle turning maneuver.

Figure 3:
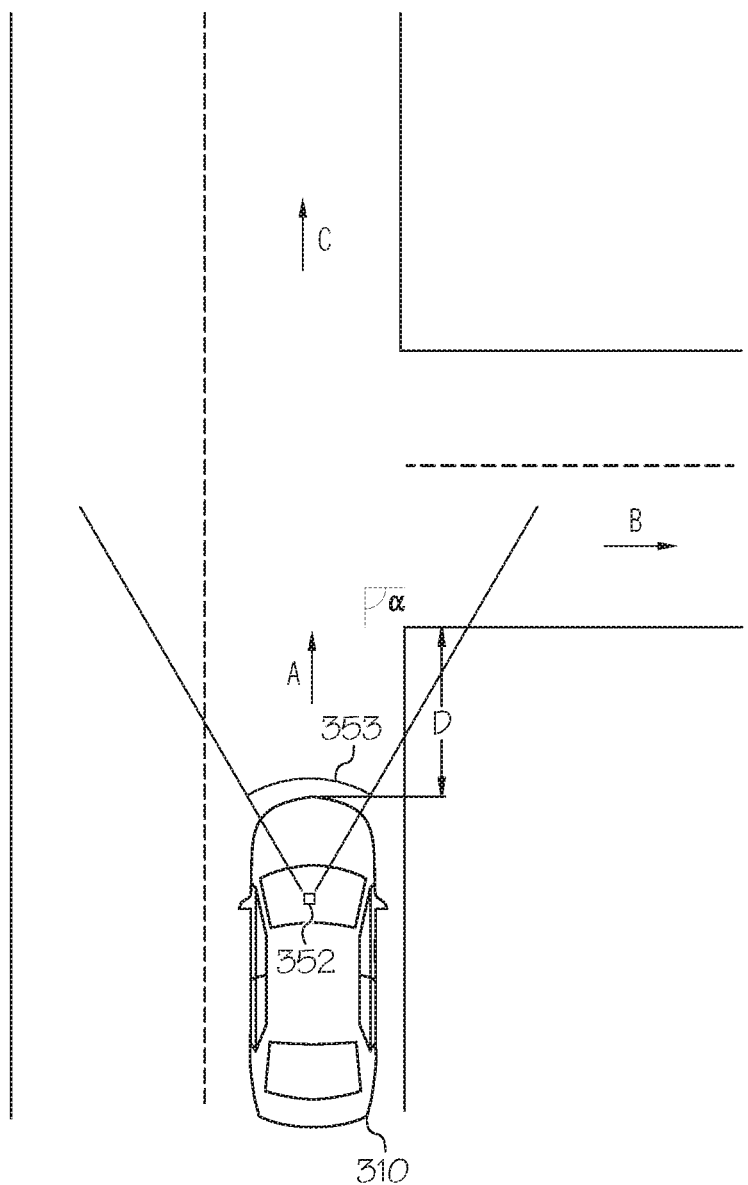
FIG. 3 is a view illustrating a vehicle equipped with the turn signal system approaching a three-way intersection according to one or more embodiments shown and described herein.

Referring now to FIGS. 3-7, a number of example driving situations are depicted including a vehicle 310 enabled with the turn signal system. In FIG. 3, a vehicle 310 equipped with the turn signal system is shown approaching a three-way intersection. Vehicle 310, for example, includes at least one external environment camera 352 mounted on the dashboard of the vehicle positioned to view the environment in front of the vehicle. The at least one external environment camera 352 includes an example field-of-view 353. The vehicle 310 has a current trajectory depicted by arrow A. Based on the current trajectory, A, the vehicle 310 is approaching an interesting road on the right. This may be determined by processing image data captured by the at least one external environment camera 352. In response to identifying the road, the electronic control unit may also determine a distance, D, between the vehicle 310 and the road on the right and an angle, $\alpha$, between the current trajectory, A, and a predicted vehicle trajectory, depicted by arrow B, upon completing the vehicle turning maneuver. Based on the distance, D, and angle, $\alpha$, (e.g. about 90 degrees) the electronic control unit may calculate or select the threshold. The electronic control unit may then compare the vehicle speed to the threshold and if the vehicle speed is below the threshold then the electronic control unit may automatically activate the right turn signal indicating the vehicle 310 is likely going to be turning right.

If the vehicle speed is not below the threshold, then the electronic control unit may predict the vehicle turning maneuver with a low confidence level, which in turn may not cause the electronic control unit to activate turn signal until the vehicle speed is below the threshold. In such a case, the electronic control unit may also continuously update the threshold as the distance between the vehicle 310 and the road on the right decreases. If the vehicle speed does not start to decrease as it approaches the road on the right the confidence level associated with the predicted vehicle turning maneuver onto the road on the right will continue to decrease.

In some embodiments, the at least one external environment camera 352 may also capture road signs or traffic lights. In the event a stop sign or a traffic light is determined by the electronic control unit from the image data provided by the at least one external environment camera 352, then the step of predicting a vehicle turning maneuver may require additional information prior to activating the turn signal. In other words, if a stop sign is present at the intersection of the current trajectory of the vehicle 310 and the road on the right, then the confidence level of a prediction that the vehicle 310 is likely to make a right turn onto the road on the right based on the vehicle speed being below a threshold will be lowered because the vehicle 310 may be slowing to stop at the stop sign and not in anticipation of making a turn. In such a case, the turn signal system may utilize additional input information to update the prediction of a vehicle turning maneuver. For example, as described above in more detail, a driver action from one or more driver facing cameras may provide insight into whether the vehicle 310 will be making a right turn or continuing in the direction of arrow C.

In some embodiments, the driver profile may also provide additional information. For example, if the road on the right is a typical route or turn according to the driver profile that a driver takes then the likelihood that the vehicle 310 will turn right increases and the confidence level may be adjusted accordingly. Similarly, if a navigation unit indicates that the turn is part of a planned route then the likelihood that the vehicle 310 will turn right increases and the confidence level may be adjusted accordingly.

Figure 4:
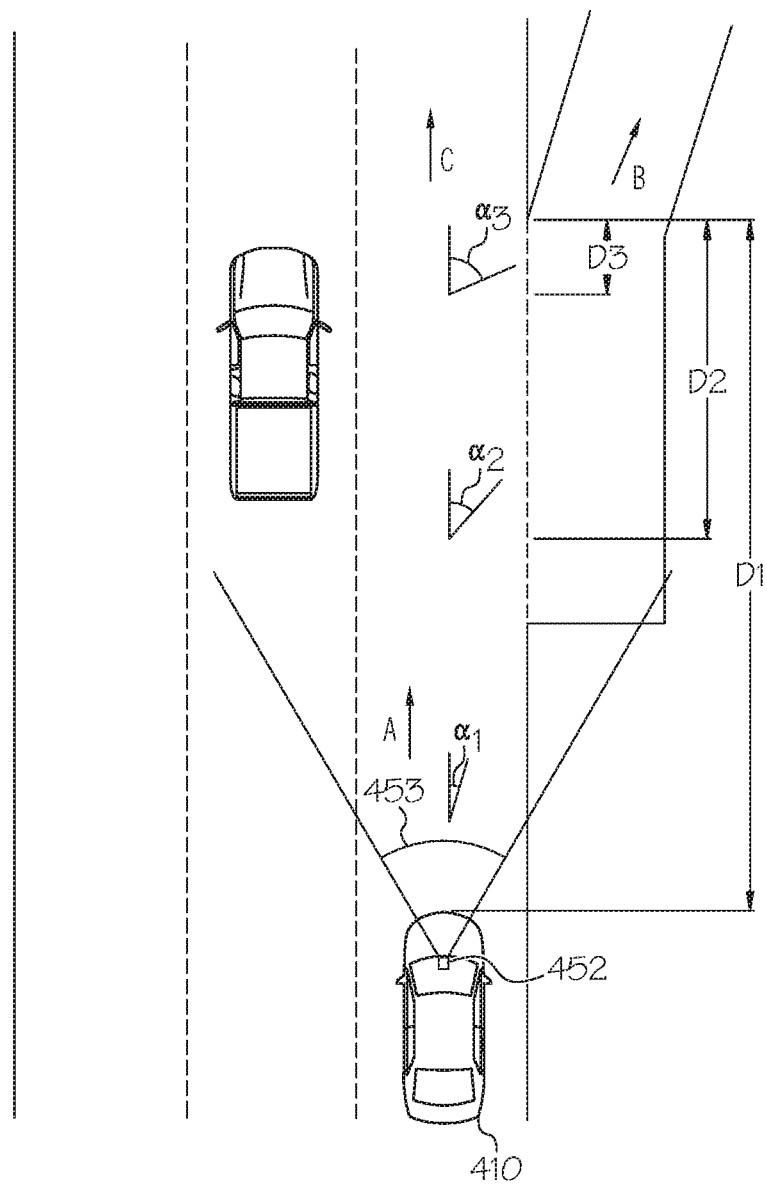
FIG. 4 is a view illustrating a vehicle equipped with the turn signal system approaching an exit ramp according to one or more embodiments shown and described herein.

Referring now to FIG. 4, a vehicle 410 equipped with the turn signal system is shown approaching an exit ramp. Vehicle 410, for example, includes at least one external environment camera 452 mounted on the dashboard of the vehicle 410 positioned to view the environment in front of the vehicle 410. The at least one external environment camera 452 includes an example field-of-view 453. The vehicle 410 has a current trajectory depicted by arrow A. Based on the current trajectory, A, the vehicle 410 is approaching an exit ramp on the right. This may be determined from the at least one external environment camera 452. In response to identifying the exit ramp, the electronic control unit may also determine a distance, D1, which is the distance from the vehicle 410 to the entrance to the exit ramp and an angle α1, which is the angle between the current trajectory, A, and a predicted vehicle trajectory, depicted by arrow B, upon completing the vehicle turning maneuver. Based on distance D1 and angle α1 the electronic control unit may calculate or select a first threshold. As the vehicle 410 proceeds to a distance, D2, from the entrance of the exit ramp angle α1 increases to angle α2, resulting in the electronic control unit calculating or selecting a second threshold that is lower than the first threshold. Furthermore, as the vehicle 410 proceeds to a distance, D3, from the entrance of the exit ramp angle α2 increases to angle α3, resulting in the electronic control unit calculating or selecting a third threshold that is lower than the second threshold. In other words, the electronic control unit may vary the threshold in response to the distance between the entrance to the exit ramp and the vehicle 410 and the angle required to execute the vehicle turning maneuver. At some point, the distance and angle may exceed the turning radius or other structural capabilities of the vehicle 410, which may be included as inputs in the turn signal system. Exceeding the turning radius or other structural capabilities of the vehicle 410 may invalidate a prediction or cause the confidence level to decrease.

The electronic control unit may then compare the vehicle speed to the threshold and if the vehicle speed is below the threshold then the electronic control unit automatically activates the right turn signal indicating the vehicle 410 is likely going to be turning right. However, if the vehicle speed is not below the threshold, then the electronic control unit may predict the vehicle turning maneuver with a low confidence level, which in turn may not cause the electronic control unit to activate the turn signal until the vehicle speed is below the threshold. In such a case, the electronic control unit may also continuously update the threshold as the distance between the vehicle 410 and the entrance of the exit ramp on the right decreases and the angle increases. As the threshold is updated, the electronic control unit also continues to compare the vehicle speed to the updated threshold. If the vehicle speed does not start to decrease as vehicle 410 closes in on the entrance of the exit ramp on the right the confidence level associated with the predicted vehicle turning maneuver onto the exit ramp will continue to decrease.

Figure 5:
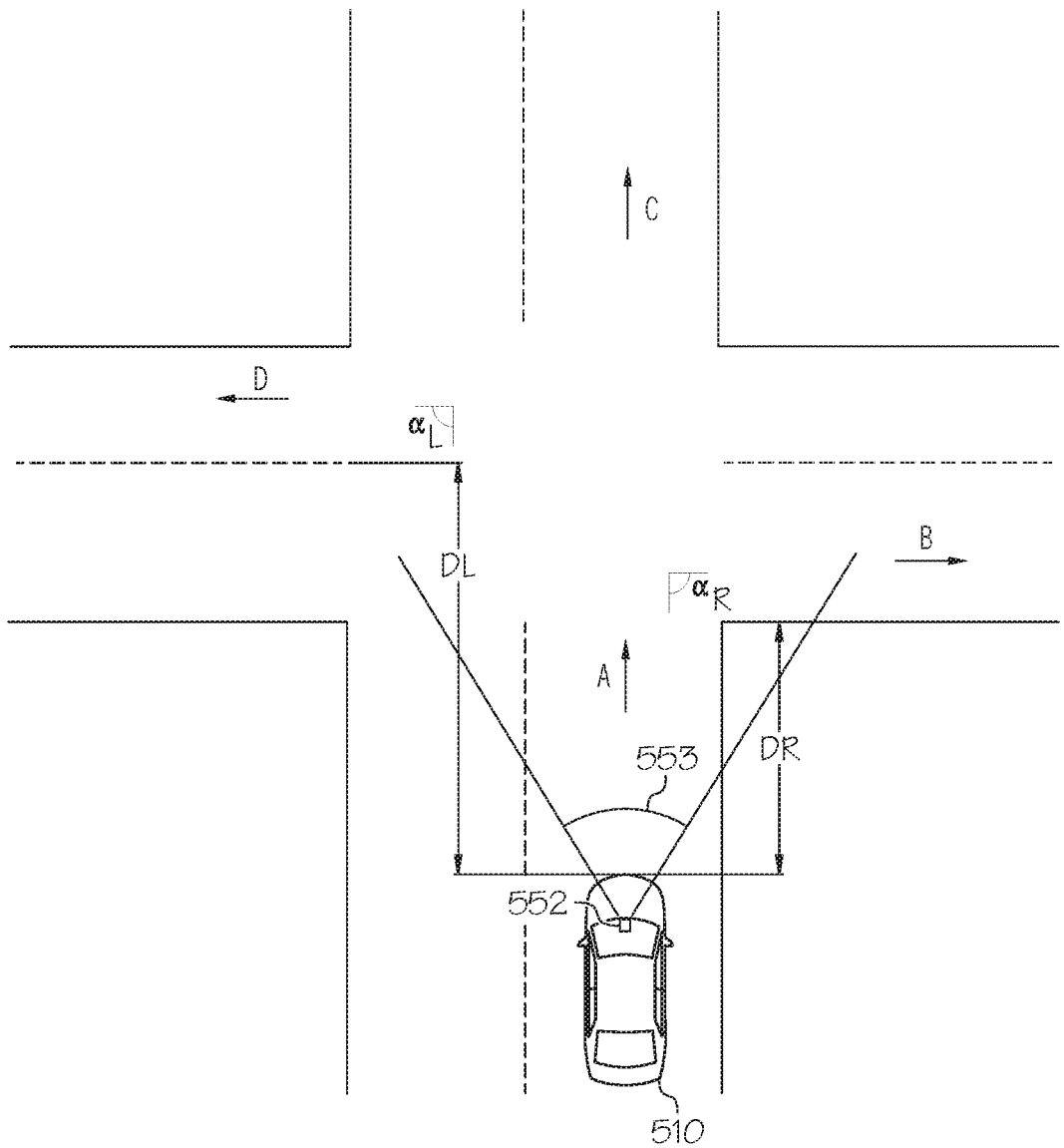
FIG. 5 is a view illustrating a vehicle equipped with the turn signal system approaching a four-way intersection according to one or more embodiments shown and described herein.

In another example situation, FIG. 5 depicts a vehicle 510 equipped with the turn signal system approaching a four-way intersection. Vehicle 510, for example, includes at least one external environment camera 552 mounted on the dashboard of the vehicle 510 positioned to view the environment in front of the vehicle 510. The at least one external environment camera 552 includes an example field-of-view 553. The vehicle 510 has a current trajectory depicted by arrow A. Based on the current trajectory, A, the vehicle 510 is approaching a four-way intersection. This presence of the four-way intersection may be determined from the at least one external environment camera 552. In response to identifying the intersection, the electronic control unit may also determine the distances and angles associated with each of the possible turns a vehicle 510 may make at the intersection. For example, distance, DR, is the distance from the vehicle 510 and the right turn at the intersection and angle αR is the angle between the current trajectory, A, and a predicted vehicle trajectory, depicted by arrow B, upon completing a right vehicle turning maneuver at the intersection. Similarly, distance, DL, is the distance from the vehicle 510 and the left turn at the intersection and angle αL is the angle between the current trajectory, A, and a predicted vehicle trajectory, depicted by arrow D, upon completing a left vehicle turning maneuver at the intersection. Based on each distance DR and DL and each angle αR and αL, the electronic control unit may calculate or select a first threshold associated with predicting a right turn and a second threshold associated with predicting a left turn. The electronic control unit may then compare the vehicle speed to the first and second thresholds and if the vehicle speed is below either the first threshold or second threshold then the electronic control unit may automatically activate the turn signal for the respective predicted vehicle turning maneuver. In such a case where multiple turns are possible, a confidence level associated with each possible turn or no turn (i.e., a generally straight heading) may be compared to determine which turn based on the confidence level is more likely than the others.

In some embodiments, the electronic control unit may process additional sensor data to refine the prediction of a vehicle turning maneuver. The additional data may include driver actions determined from one or more driver facing cameras, GPS and map data and driver profiles that may indicate preferred routes or driver actions indicative of initiating a turn.

Figure 6:
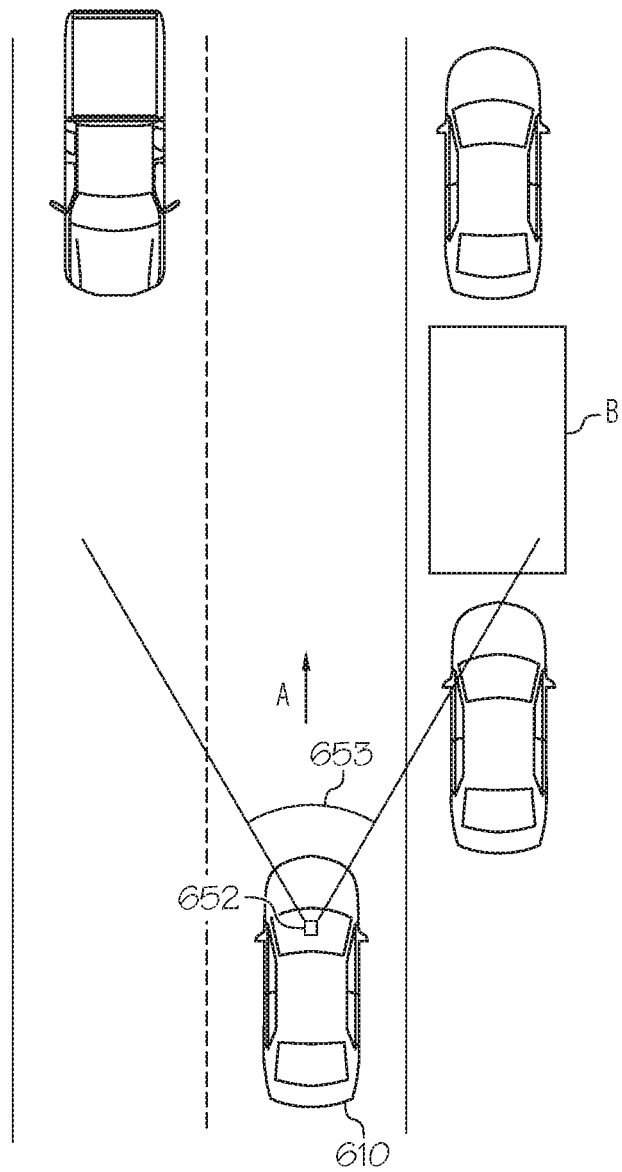
FIG. 6 is a view illustrating a vehicle equipped with the turn signal system approaching a parallel parking location according to one or more embodiments shown and described herein.
Figure 7:
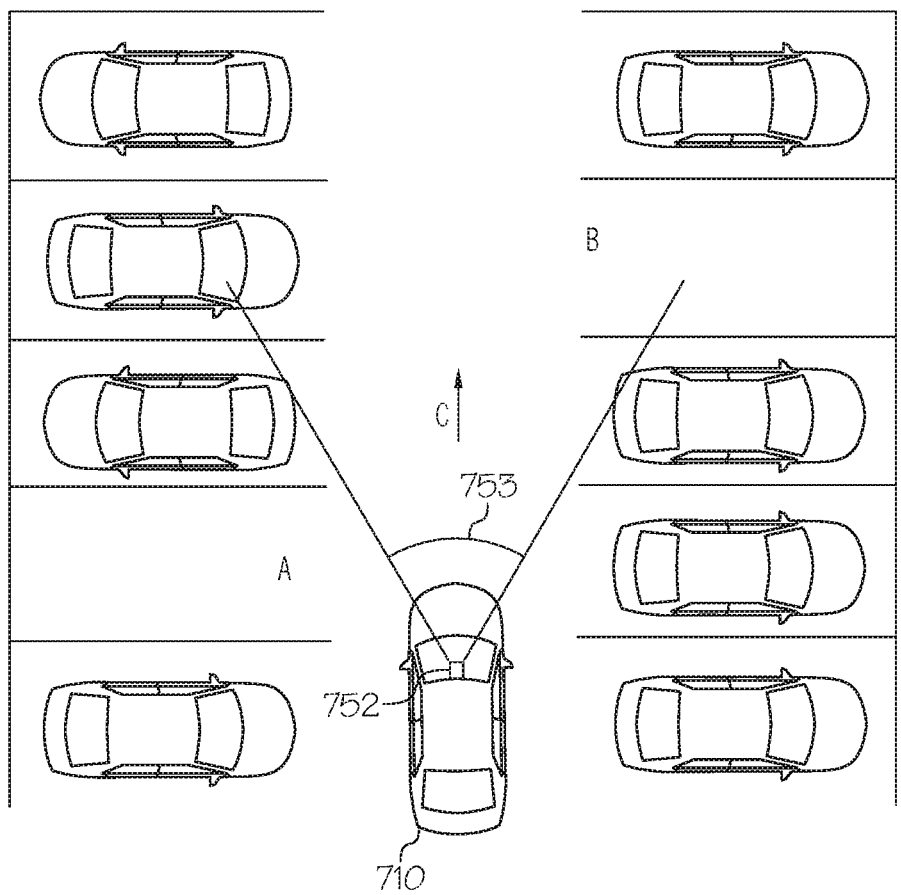
FIG. 7 is a view illustrating a vehicle equipped with the turn signal system navigating a parking lot for a parking spot according to one or more embodiments shown and described herein.

Referring now to FIGS. 6 and 7, examples of the turn signal system are illustrated with respect to a vehicle turning maneuver in a parking context. FIG. 6 depicts a vehicle 610 approaching a parallel parking location. The vehicle 610 includes at least one external environment camera 652 mounted on the dashboard of the vehicle 610 positioned to view the environment in front of the vehicle 610. The at least one external environment camera 652 includes an example field-of-view 653. The vehicle 610 has a current trajectory depicted by arrow A. Based on the current trajectory, A, the vehicle 610 is approaching a parallel parking location, B. Similar to determining an intersecting road, a parallel parking location may be determined from image data generated by the at least one external environment camera 652. If the vehicle speed is below the threshold as the vehicle 610 approaches the parallel parking location B then the electronic control unit may automatically activate the right turn signal indicating the vehicle 610 is likely going to be turning right. However, if another object or sign is detected causing the vehicle 610 to slow or stop, then the confidence level of the prediction may be decreased and the electronic control unit may not activate the turn signal to indicate the vehicle 610 will enter the parallel parking location. In the parallel parking context a vehicle 610 may proceed past the parallel parking location before initiating a vehicle turning maneuver to enter the location. In such a case, the turn signal may remain active unless the vehicle speed exceeds the threshold in a direction away from the parallel parking location.

Referring now to FIG. 7, another parking example of the turn signal system is illustrated with respect to a vehicle turning maneuver in a parking context. Here, a vehicle 710 is navigating a parking lot for a parking spot. The vehicle 710 includes at least one external environment camera 752 mounted on the dashboard of the vehicle 710 positioned to view the environment in front of the vehicle 710. The at least one external environment camera 752 includes an example field-of-view 753. The vehicle 710 has a current trajectory depicted by arrow C. Based on the current trajectory, arrow C, the vehicle 710 is approaching a parking spot B on the right. Similar to determining an intersecting road, a parking spot may be determined from image data generated by the at least one external environment camera 752. If the vehicle speed is below the threshold as the vehicle 710 approaches the parking spot B, then the electronic control unit may automatically activate the right turn signal indicating the vehicle 710 is predicted to turn right. Although parking spot A may have been previously predicted, once the vehicle 710 moves beyond a capable turning radius to enter parking spot A the left turn signal may be deactivated or if not previously activated the confidence level associated with turning left into parking spot A would be decreased. However, if the vehicle 710 passes parking spot A and subsequently shifts into reverse, then the turn signal system may activate the left turn signal because the vehicle 710 may be predicted to be backing into parking spot B.

Additionally, if another object or sign is detected resulting in the vehicle 710 to slow or stop, then the confidence level of the prediction may be decreased and the electronic control unit may not activate the turn signal to indicate the vehicle 710 is entering the parking spot.

If the vehicle speed is not below the threshold, then the electronic control unit may predict the vehicle turning maneuver with a low confidence level, which in turn may not cause the electronic control unit to activate turn signal until the vehicle speed is below the threshold. In such a case, the electronic control unit may also continuously update the threshold as the distance between the vehicle 710 and the parking spot B on the right decreases. If the vehicle speed does not start to decrease as it approaches the parking spot B on the right the confidence level associated with the predicted vehicle turning maneuver into the parking spot B on the right will continue to decrease.

Additionally, while the above examples describe the turn signal system as including at least one external environment camera as the one or more external vehicle environment sensors it should be understood that the one or more external vehicle environment sensors is not limited to including at least one external environment camera. Other sensors and systems may readily replace all or some of the functionality provided by the at least one external environment camera.

It should now be understood that embodiments described herein are directed to turn signal systems that determine a vehicle speed, predict a vehicle turning maneuver based on one or more external environment sensors identifying a road, a driveway, an alley, an exit or entrance ramp or the like when the vehicle speed is below a threshold and automatically activating the turn signal in response to predicting the vehicle turning maneuver. The turn signal system includes at least a vehicle speed sensor, one or more external environment sensors, an electronic control unit enabled to receive signals from the one or more external environment sensors and the vehicle speed sensor and a turn signal system. The one or more external environment sensors may include at least one external environment camera to identify a road, a driveway, an alley, an exit or entrance ramp or the like, which subsequently enables a prediction of whether a vehicle turning maneuver is forthcoming.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A turn signal system for activating a turn signal of a vehicle comprising:
   an electronic control unit comprising a processor and a non-transitory computer readable memory;
   one or more external vehicle environment sensors communicatively coupled to the electronic control unit;
   a vehicle speed sensor communicatively coupled to the electronic control unit;
   a turn signal communicatively coupled to the electronic control unit; and
   a machine-readable instruction set stored in the non-transitory computer readable memory that causes the turn signal system to perform at least the following when executed by the processor:
      determine a vehicle speed based on an output signal of the vehicle speed sensor;
      determine the vehicle speed is below a threshold, wherein the threshold is based on at least one of: (i) a distance between a current vehicle location and a predicted location of a vehicle turning maneuver or (ii) an angle between a current vehicle trajectory and a predicted vehicle trajectory upon completing the vehicle turning maneuver;
      predict the vehicle turning maneuver based on one or more environment signals output by the one or more external vehicle environment sensors when the vehicle speed is below the threshold; and
      automatically activate the turn signal in response to predicting the vehicle turning maneuver.

2. The turn signal system of claim 1, wherein the machine-readable instruction set further causes the processor to:
   determine the angle between the current vehicle trajectory and the predicted vehicle trajectory upon completing the vehicle turning maneuver; and
   select the threshold from the non-transitory computer readable memory based on the angle.

3. The turn signal system of claim 1, wherein the machine-readable instruction set further causes the processor to:
   determine the distance between the current vehicle location and the predicted location of the vehicle turning maneuver, and select the threshold from the non-transitory computer readable memory based on the distance.

4. The turn signal system of claim 1, wherein the one or more external vehicle environment sensors comprises at least one external environment camera communicatively coupled to the electronic control unit, and wherein the at least one external environment camera automatically captures image data and transmits the image data to the electronic control unit and the machine-readable instruction set further causes the processor to:
 receive the image data from the at least one external environment camera; and
 determine at least one of an intersecting thoroughfare and a parking location based on the image data.

5. The turn signal system of claim 1, wherein the one or more external vehicle environment sensors comprises at least one LIDAR sensor communicatively coupled to the electronic control unit, and wherein the at least one LIDAR sensor automatically captures topography data and transmits the topography data to the electronic control unit and the machine-readable instruction set further causes the processor to:
 receive the topography data from the at least one LIDAR sensor and
 determine at least one of an intersecting thoroughfare and a parking location based on the topography data.

6. The turn signal system of claim 1, further comprising one or more driver centric sensors communicatively coupled to the electronic control unit, wherein the one or more driver centric sensors generate one or more signals indicative of one or more conditions around a driver, wherein the one or more driver centric sensors comprises:
 an infrared light emitter focusing infrared light onto one or more eyes of the driver; and
 one or more driver facing cameras comprising an infrared camera positioned to capture the infrared light reflected from the one or more eyes of the driver.

7. The turn signal system of claim 6, wherein the machine-readable instruction set further causes the processor to:
 receive image data from the one or more driver facing cameras;
 determine a driver action comprising at least one of a driver head movement and a driver eye movement based on the image data from the one or more driver facing cameras; and
 update the prediction of the vehicle turning maneuver with a prediction of the vehicle turning maneuver based on the one or more environment signals output by the one or more external vehicle environment sensors and the driver action when the vehicle speed is below the threshold.

8. A method for activating a turn signal of a vehicle, the method comprising:
 determining a vehicle speed based on an output signal of a vehicle speed sensor;
 determining the vehicle speed is below a threshold, wherein the threshold is based on at least one of: (i) a distance between a current vehicle location and a predicted location of a vehicle turning maneuver or (ii) an angle between a current vehicle trajectory and a predicted vehicle trajectory upon completing the vehicle turning maneuver;
 predicting the vehicle turning maneuver based on one or more signals output by one or more external vehicle environment sensors when the vehicle speed is below the threshold; and
 activating the turn signal of the vehicle in response to predicting the vehicle turning maneuver.

9. The method of claim 8, further comprising:
 determining the threshold based on the angle between the current vehicle trajectory and the predicted vehicle trajectory upon completing the vehicle turning maneuver.

10. The method of claim 8, further comprising:
 determining the threshold based on the distance between the current vehicle location and the predicted location of the vehicle turning maneuver.

11. The method of claim 8, further comprising:
 receiving image data from the one or more external vehicle environment sensors wherein the one or more external vehicle environment sensors comprises at least one external environment camera; and
 determining at least one of an intersecting thoroughfare or a parking location based on the image data.

12. The method of claim 8, further comprising:
 receiving topography data from the one or more external vehicle environment sensors wherein the one or more external vehicle environment sensors comprises at least one LIDAR sensor; and
 determining at least one of an intersecting thoroughfare and a parking location based on the topography data.

13. The method of claim 8, further comprising:
 receiving image data from one or more driver facing cameras;
 determining a driver action comprising at least one of a driver head movement and driver eye movement based on the image data from the one or more driver facing cameras; and
 updating the prediction of the vehicle turning maneuver based on one or more environment signals output by the one or more external vehicle environment sensors when the vehicle speed is below the threshold with a prediction of the vehicle turning maneuver based on the one or more environment signals output by the one or more external vehicle environment sensors and the driver action when the vehicle speed is below the threshold.

14. A vehicle having a turn signal system for activating a turn signal of the vehicle comprising:
 an electronic control unit comprising a processor and a non-transitory computer readable memory;
 at least one external environment camera for capturing image data of an external environment of the vehicle communicatively coupled to the electronic control unit;
 a vehicle speed sensor communicatively coupled to the electronic control unit;
 a turn signal communicatively coupled to the electronic control unit; and
 a machine-readable instruction set stored in the non-transitory computer readable memory that causes the turn signal system to perform at least the following when executed by the processor:
  determine a vehicle speed based on an output signal of the vehicle speed sensor;
  determine the vehicle speed is below a threshold, wherein the threshold is based on at least one of: (i) a distance between a current vehicle location and a predicted location of a vehicle turning maneuver or (ii) an angle between a current vehicle trajectory and a predicted vehicle trajectory upon completing the vehicle turning maneuver;

predict the vehicle turning maneuver based on the image data from the at least one external environment camera when the vehicle speed is below the threshold; and automatically activate the turn signal in response to predicting the vehicle turning maneuver.

15. The vehicle of claim 14, further comprising:

a global positioning system communicatively coupled to the electronic control unit, wherein the global positioning system provides one or more signals indicative of a vehicle location; and map data stored in the non-transitory computer readable memory, wherein the machine-readable instruction set further causes the processor to:

correlate the image data to the map data based on the vehicle location provided by the global positioning system; and update the prediction of the vehicle turning maneuver based on the correlation of the image data with the map data.

16. The vehicle of claim 15, wherein the machine-readable instruction set further causes the processor to:

determine the angle between the current vehicle trajectory and predicted vehicle trajectory upon completing the vehicle turning maneuver;

determine the distance between the current vehicle location and the predicted location of the vehicle turning maneuver, and select the threshold from the non-transitory computer readable memory based on the angle and the distance.

17. The turn signal system of claim 1, wherein the machine-readable instruction set further causes the processor to:

determine a confidence level associated with the predicted vehicle turning maneuver, wherein the confidence level is determined based on the vehicle speed, wherein automatically activating the turn signal is further in response to determining the confidence level associated with the predicted vehicle turning maneuver is above a predetermined confidence level.

18. The method of claim 8, further comprising:

determining a confidence level associated with the predicted vehicle turning maneuver, wherein the confidence level is determined based on the vehicle speed, wherein activating the turn signal is further in response to determining the confidence level associated with the predicted vehicle turning maneuver is above a predetermined confidence level.

19. The vehicle of claim 14, wherein the machine-readable instruction set further causes the processor to:

determine a confidence level associated with the predicted vehicle turning maneuver, wherein the confidence level is determined based on the vehicle speed, wherein automatically activating the turn signal is further in response to determining the confidence level associated with the predicted vehicle turning maneuver is above a predetermined confidence level.

* * * * *

UNITED STATES PATENT AND TRADEMARK OFFICE
CERTIFICATE OF CORRECTION

PATENT NO.         : 10,525,873 B2                                             Page 1 of 1
APPLICATION NO.    : 15/899458
DATED              : January 7, 2020
INVENTOR(S)        : Todd J. Rowell It is certified that error appears in the above-identified patent and that said Letters Patent is hereby corrected as shown below:

In the Claims

In Column 23, Line 24, Claim 16 after "and" and before "predicted", insert --the--.

Signed and Sealed this
Seventh Day of April, 2020

Andrei Iancu
*Director of the United States Patent and Trademark Office*